US010180233B2

(12) United States Patent
Sepkhanov et al.

(10) Patent No.: US 10,180,233 B2
(45) Date of Patent: Jan. 15, 2019

(54) LUMINAIRE WITH A LIGHT DIFFUSER (71) Applicant: PHILIPS LIGHTING HOLDING B.V., Eindhoven (NL)

(72) Inventors: Ruslan Akhmedovich Sepkhanov, Eindhoven (NL); Marcellinus Petrus Carolus Michael Krijn, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 398 days.

(21) Appl. No.: 15/038,396

(22) PCT Filed: Nov. 25, 2014

(86) PCT No.: PCT/EP2014/075445
§ 371 (c)(1),
(2) Date: May 20, 2016

(87) PCT Pub. No.: WO2015/075251
PCT Pub. Date: May 28, 2015

(65) Prior Publication Data
US 2016/0290593 A1 Oct. 6, 2016

(30) Foreign Application Priority Data

Nov. 25, 2013 (EP) .................................. 13194224

(51) Int. Cl.
*G02B 5/02* (2006.01)
*F21V 5/00* (2018.01)
(Continued)

(52) U.S. Cl.
CPC ............ *F21V 5/005* (2013.01); *G02B 5/0231* (2013.01); *G02B 5/0263* (2013.01);
(Continued)

(58) Field of Classification Search
CPC ........................... G02B 5/0278; G02B 6/0061
See application file for complete search history.

(56) References Cited

U.S. PATENT DOCUMENTS 5,057,974 A * 10/1991 Mizobe ................ G02B 6/0041
362/23.15
7,452,105 B2 11/2008 Hough
(Continued)

FOREIGN PATENT DOCUMENTS

CN 102767786 A 11/2012
CN 202708984 U 1/2013
(Continued)

Primary Examiner — Andrew Coughlin
(74) Attorney, Agent, or Firm — Akarsh P. Belagodu (57) ABSTRACT A luminaire comprising: a light source (10); an exit window (20) for light from the light source; and a diffuser (25; 200*a*; 200*b*; 200*c*; 200*d*) at the exit window for diffusing the light. The diffuser comprises a plurality of micro-optical elements (203*a*; 203*b*; 204, 205; 206, 207). Each micro-optical element is adapted to redirect light from the light source, so that the redirected light from each element emerges from the diffuser at a respective predetermined polar angle (Θ). The plurality of micro-optical elements comprise first micro-optical elements, which redirect light from the light source into a first range of polar angles, wherein the first optical elements occupy a greater proportion of the area of the diffuser in a first neighborhood than in a second neighborhood, and wherein the first neighborhood receives less light from the light source than the second neighborhood. Also provided is a method of designing and manufacturing a diffuser for such a luminaire.

14 Claims, 5 Drawing Sheets (51) Int. Cl.
*G02B 19/00* (2006.01)
*F21Y 101/00* (2016.01)
(52) U.S. Cl.
CPC ........ *G02B 5/0278* (2013.01); *F21Y 2101/00* (2013.01); *G02B 19/0061* (2013.01)

(56) References Cited

U.S. PATENT DOCUMENTS

| | | | |
|---|---|---|---|
| 2002/0015297 A1* | 2/2002 | Hayashi | G01D 11/28 362/23.16 |
| 2009/0021958 A1 | 1/2009 | Chang | |
| 2009/0115400 A1 | 5/2009 | Hunger | |
| 2009/0128914 A1 | 5/2009 | Lee et al. | |
| 2009/0174346 A1* | 7/2009 | Hwang | G07F 17/32 315/294 |
| 2011/0096567 A1 | 4/2011 | Tiao et al. | |
| 2012/0155081 A1 | 6/2012 | Vissenberg et al. | |
| 2014/0307418 A1* | 10/2014 | Zheng | F21K 9/50 362/97.1 |

FOREIGN PATENT DOCUMENTS

| | | |
|---|---|---|
| EP | 588504 A1 | 3/1994 |
| WO | WO2013046081 A1 | 4/2013 |
| WO | WO2013068865 A1 | 5/2013 |

\* cited by examiner

LUMINAIRE WITH A LIGHT DIFFUSER

CROSS-REFERENCE TO PRIOR APPLICATIONS

This application is the U.S. National Phase application under 35 U.S.C. § 371 of International Application No. PCT/EP2014/075445, filed on Nov. 25, 2014, which claims the benefit of European Patent Application No. 13194224.5, filed on Nov. 25, 2013. These applications are hereby incorporated by reference herein.

FIELD OF THE INVENTION

This invention relates to luminaires in general and, in particular, to a diffuser for a luminaire. It is especially relevant for luminaires designed to be mounted on a ceiling, oriented substantially vertically downward.

BACKGROUND OF THE INVENTION

In lighting applications, the luminaires are required to provide a certain angular light distribution. Additionally, it is often desired that the luminaire exit window appears uniformly lit. That is, the luminous emittance of the exit window should be spatially uniform. This means that the luminous emittance $M_v(\vec{\rho}, \theta_0, \varphi_0)$ at the angles $\theta_0$ and $\varphi_0$ of the exit window should not depend on the position $\vec{\rho}$ within that exit window. The luminous emittance at the angles $\theta_0$ and $\varphi_0$ is obtained by integrating the luminance of the exit window $L_v(\vec{\rho}, \theta_0, \varphi_0)$ over a solid angle. The solid angle corresponds to a human eye pupil size at some typical distance from the exit window. Because the angular pupil size $\Delta\Omega(\theta_0)$ is small, the luminous emittance as a function of the coordinate $\vec{\rho}$ within the exit window, observed from the inclination angle (polar angle) $\theta_0$ and the azimuth angle $\varphi_0$, can be expressed as follows:

$$M_v(\vec{\rho},\theta_0,\varphi_0)=L_v(\vec{\rho},\theta_0,\varphi_0)\Delta\Omega(\theta_0)OK,na \quad (1)$$

The total luminous emittance (integrated over all angles) $\overline{M}_v(\vec{\rho})$ or simply the luminous emittance is given by $$\overline{M}_v(\vec{\rho})=\int L_v(\vec{\rho},\theta,\varphi)d\Omega \quad (2)$$

The requirement to provide a specific angular light distribution is the main optical problem of lighting. Combined with the uniformity requirement, it becomes a significant challenge. This challenge is made more difficult by the trend to replace other light sources with Light-Emitting Diodes (LEDs). Although LED luminaires can provide a significant reduction in energy consumption, their exit windows can appear visually unusual and less appealing than traditional luminaires. The reason is the geometrical form-factor of the LED light sources: they are relatively small, creating highly non-uniform luminous emittance (typically observed as a "spotty" or "dotted" pattern) of the luminaire's exit window. This may even cause unpleasant glare effects.

It is desirable to provide luminaires that are less spotty. To date, many of the attempts to achieve this have involved reflecting light from the exit window back into the luminaire. This reflection is associated with optical losses and lower optical efficiency, which conflicts with the desire to save energy.

SUMMARY OF THE INVENTION

The invention is defined by the claims.
According to an aspect of the invention, there is provided a luminaire comprising:
  a light source;
  an exit window for light from the light source; and
  a diffuser at the exit window for diffusing the light,
  wherein the diffuser comprises a plurality of micro-optical elements, each micro-optical element adapted to redirect light from the light source, so that the redirected light from each element emerges from the diffuser at a respective predetermined polar angle,
  wherein the plurality of micro-optical elements comprises a first type of micro-optical elements, which redirect light from the light source into a first range of polar angles,
  wherein the first optical elements occupy a greater proportion of the area of the diffuser in a first neighbourhood than in a second neighbourhood,
  wherein the first neighbourhood receives less light from the light source than the second neighbourhood.

The plurality of optical elements may further comprise a second type of micro-optical elements, which redirect light from the light source into a second range of polar angles, wherein the polar angles of the first range are greater than the polar angles of the second range.

A micro-optical element is an optical element which has a size in the range 0.00007 mm$^2$ to 0.2 mm$^2$. For brevity, the micro-optical elements are also referred to herein simply as "optical elements".

By choosing the polar angles as defined above, the diffuser appears to have a uniform luminous emittance, when observed from the first polar angle and appears to have a non-uniform luminous emittance, when observed from the second polar angle. Embodiments of the present invention can therefore enable the designer to achieve a uniform appearance at certain polar viewing angles by sacrificing uniformity at other polar viewing angles. Preferably, the luminous emittance that is output by the diffuser at the first polar angle is uniform among neighbourhoods at all locations on the diffuser.

The luminous emittance at different angles may be changed in each neighbourhood, but the total luminous emittance (over all angles) from that neighbourhood remains the same. Thus, the diffuser changes the direction of the light, but not the amount of light emitted from each neighbourhood. The total luminous emittance of the light arriving at each neighbourhood of the diffuser and the light leaving that neighbourhood is the same.

Preferably, the polar angles of the optical elements are chosen such that the luminous emittance that is output by the diffuser in a first range of polar angles is uniform among the neighbourhoods; and the luminous emittance that is output by the diffuser in a second range of polar angles is non-uniform among said neighbourhoods. The first and second ranges do not overlap. The luminaire will then appear uniform when viewed from any angle that lies in the first range of polar angles.

For each of a plurality of locations on the diffuser, the proportion of the area of the diffuser occupied by the first type of micro-optical elements times the amount of light received from the light source is essentially the same to yield a spatial uniform luminous emittance U>0.5 within said first range of polar angles, U being defined as $$U = 1 - \frac{l_{max} - l_{min}}{l_{max} + l_{min}}$$

wherein $l_{max}$ and $l_{min}$ are the maximum and minimum values, respectively, of luminous emittance measured over the different locations in the exit window. Uniformity, U, is determined using the equation above. The luminous emittance at a given angle (or in a given range of angles) is uniform if U>0.5 or, more preferably, if U>0.6. The luminous emittance is non-uniform if U<0.5.

The "neighbourhoods" are of a size that is smaller than the resolution discernible by the human eye at a normal viewing distance. This means that a viewer does not perceive variations in brightness within the neighbourhood. In other words, the viewer cannot perceive the brightness of individual optical elements that belong to the neighbourhood—instead, the viewer perceives only an average brightness of the elements over the neighbourhood. By way of example, the neighbourhoods may have an area of 1 mm² to 2 mm². The shape of the neighbourhood should be compact, not eccentric. For the purposes of measurement, preferably, the neighbourhoods are square or circular in shape, and are all the same size.

The light redirected by each element emerges from the diffuser at the location of the micro-optical element at a predetermined polar angle. Thus, the polar angle of a micro-optical element refers to the polar angle at which light emerges from that micro-optical element. The polar angle is defined relative to the intended orientation of the luminaire. For example, if the luminaire is designed to be mounted on the ceiling, pointing vertically downward, then the polar angle is defined relative to the vertical axis (that is, the normal to the ceiling). Many luminaires are rotationally symmetric. In this case, the reference direction for the polar angle is parallel to the axis of symmetry.

In general, the light will enter and/or emerge from each micro-optical element not at a single unique angle, but with a small spread of angles. The "predetermined polar angle" refers to the nominal angle at the centre of this spread. The angular spread of light rays about the predetermined polar angle may be for example up to 5°.

The optical elements are spread over the diffuser. The diffuser is typically planar or shell-like, with approximately uniform thickness, such that the position of each optical element within the diffuser can be characterised uniquely by two coordinates.

Each micro-optical element may comprise one or more facets. A facet is a flat (two-dimensional) interface between two physical media of differing refractive index. The facets are preferably formed on a surface of the diffuser, whereby one of the physical media is the material of the diffuser and the other physical medium is air.

The diffuser is preferably formed of transparent solid material, such as a polycarbonate.

Each micro-optical element preferably comprises at least one of the following micro-optical structures: a free-shape micro-optical lens, a flat facet, a curved surface, and a prismatic micro-structure.

The first polar angle is preferably greater than the second polar angle.

This configuration may be particularly advantageous for a luminaire designed to be mounted on a horizontal ceiling, facing vertically downwards. Such luminaires are typically viewed from large polar angles (that is, shallow angles with the horizontal ceiling). All parts of the luminaire will appear uniformly bright to a user viewing from a large polar angle. The luminaire will not appear uniform to a user viewing from a small polar angle. However, when a user is directly beneath a ceiling mounted luminaire, the user is unlikely to look directly upwards into the luminaire. Hence, it is not essential to give the impression of uniform luminous emittance at small polar angles.

The plurality of micro-optical elements may comprise first micro-optical elements, which redirect light from the light source into a first range of polar angles, wherein the first micro-optical elements occupy a greater proportion of the area of the diffuser in a first neighbourhood than in a second neighbourhood, wherein the first neighbourhood receives less light from the light source than the second neighbourhood.

The luminous emittance of the exit window is greater in the second neighbourhood than in the first neighbourhood. In other words, more light falls on the second neighbourhood (per unit area). The first optical elements are distributed so that they compensate for this, by covering more of the diffuser in the first neighbourhood than in the second neighbourhood. In the first neighbourhood, this results in a greater proportion of the light arriving at the diffuser being redirected into the first range of polar angles. Meanwhile, in the second neighbourhood, a lesser proportion of the arriving light is redirected into this range of angles. This helps to compensate (within the first range of angles) for the inhomogeneity in the luminous emittance at the exit window.

In some embodiments, the second neighbourhood may receive more light from the light source than the first neighbourhood because the second neighbourhood is closer to the light source. This will typically be the case if the light travels directly from the light source to the diffuser or if the light is collimated by a (Fresnel) lens. In other embodiments, the second neighbourhood may receive more light because of a pattern created by other optical components in the luminaire—for example, a TIR collimator may exhibit a dark ring somewhere in the middle.

The first polar angle referred to above preferably lies within the first range of polar angles.

The first and second neighbourhoods may be the same size. The operative parameter is the total area of the diffuser (and therefore of the exit window) that is occupied by first optical elements, per unit area of the diffuser (likewise, exit window), in each neighbourhood. For the purposes of physical measurement, neighbourhoods with a size of 1 mm² to 2 mm² may be considered.

In some embodiments, at locations on the exit window that lie further from the light source, the luminous emittance will be less than at locations close to the light source. To help the luminous emittance of the exit window to appear uniform (within the first range of polar angles) the total area occupied by the first optical elements is increased further from the light source, in order to compensate (at least partly) for the decreasing luminous emittance.

In other embodiments, the luminous emittance may be lower in the first neighbourhood than the second neighbourhood for different reasons. For example, the first neighbourhood may receive less light because it lies in a dark band caused by a TIR collimator. In general, the total area occupied by the first optical elements is increased in neighbourhoods where the amount of light (luminous emittance) is lower, in order to compensate for the difference and create a uniform luminous emittance in the first range of polar angles.

The second type of micro-optical elements may occupy a greater proportion of the area of the diffuser in the second neighbourhood than in the first neighbourhood.

The second optical elements provide illumination in a second range of polar angles, closer to the normal direction. They may be arranged to occupy the remaining area not occupied by the first optical elements. In this case, when viewed from an angle within the second range of polar angles, the exit window (diffuser) will not appear uniformly bright, because the luminous emittance is greater in the second neighbourhood and, at the same time, the second optical elements occupy a greater proportion of the area in that neighbourhood. In other words, the non-uniformity caused by the non-uniform luminous emittance is further accentuated by the distribution of the second optical elements.

The second polar angle referred to above preferably lies within the second range of polar angles.

The second range of polar angles may be from 0° to an angle alpha and the first range of polar angles may be from the angle alpha to 60° or more, wherein alpha is less than or equal to 30°.

Alpha is preferably less than or equal to 25°. The upper end of the first range of angles is preferably 70° or more. In general, it is preferable for the first range of angles to be as large as possible (so that the exit window appears uniform over as large a range of angles as possible).

The first micro-optical elements may be provided in a greater spatial density in the first neighbourhood, compared with the second neighbourhood.

That is, the number of the first optical elements per unit area of the diffuser is greater in the first neighbourhood than in the second neighbourhood. This is one way of ensuring that the first optical elements cover a greater proportion of the area of the diffuser (and therefore exit window) in the first neighbourhood.

The total spatial density of (all) optical elements may be in the range 5 elements per square millimeter (/mm²) to 13000 elements per square millimeter. The spatial density of the first optical elements may be in the range 1 to the total spatial density.

First micro-optical elements of greater area may be provided in the first neighbourhood, compared with the second neighbourhood.

That is, the size of individual first optical elements may be greater in the first neighbourhood than in the second neighbourhood. This is another way of ensuring that the first optical elements cover a greater proportion of the area in the first neighbourhood.

The size of an individual optical element (that is, the area of the diffuser that it occupies) may be in the range 0.00007 mm to 0.2 mm².

In general, the optical elements in a given local neighbourhood may have similar sizes or different sizes.

Optionally, the first optical elements are both larger and more densely populated (see above) in the first neighbourhood.

For each of a plurality of locations on the diffuser, the proportion of the local area of the diffuser that is covered by the first micro-optical elements is preferably inversely proportional to the luminous emittance at that location.

In some embodiments, the density of the first optical elements per unit area of the diffuser is inversely proportional to the luminous emittance.

In other embodiments, the size of individual first optical elements is inversely proportional to the luminous emittance.

In still other embodiments, both the size of individual first optical elements and their spatial density is adapted so that the proportion of local area of the diffuser that is occupied by the first optical elements is inversely proportional to the luminous emittance.

The luminous emittance may be calculated (that is derived theoretically) or measured at the exit window.

In each micro-optical element, there may be at least one facet adapted to redirect the light by at least one of: refraction; and total internal reflection.

The diffuser may be arranged so that the light from the light source arrives at the diffuser in a direction substantially normal to the diffuser.

A small angular spread in the light is typically inevitable—and may even be desirable. Therefore, in practice, light rays may be considered "substantially normal" to the diffuser if they deviate from the normal direction by an angle of 5° or less. The normal direction to the diffuser is defined relative to the local orientation of the diffuser in the neighbourhood where the light ray arrives. It is the normal to a tangential plane of the diffuser in that neighbourhood.

The diffuser is preferably planar; and the luminaire preferably further comprises a collimator adapted to collimate the light from the light source and deliver the collimated light to the diffuser.

In this case, the diffuser defines a two-dimensional (2D) plane and it does not extend substantially in a third dimension. To put it another way, the optical elements in the diffuser are arranged on a two-dimensional plane, such that they have (substantially) identical coordinates in the third dimension. The normal direction is the same at all locations on the diffuser—it is the normal to the 2D plane.

The collimated light from the collimator arrives at the diffuser substantially perpendicular to the plane of the diffuser. In practice, an angular spread of about 5° around the normal direction can be expected. This is considered "substantially perpendicular" for the present purposes.

The micro-optical elements may be provided on a surface of the diffuser facing the light source.

Preferably, each micro-optical element comprises at least one facet. This facet may be provided on the surface of the diffuser facing the light source. In this case, the angles of the facets may be determined according to equation (6) below.

The micro-optical elements may be provided on a surface of the diffuser facing away from the light source.

Preferably, each micro-optical element comprises at least one facet. This facet may be provided on the surface of the diffuser facing away from the light source. In this case, the angles of the facets may be determined according to Equation (7) below.

The redirected light may emerge from each micro-optical element at a predetermined azimuthal angle, wherein the distribution of light over a predetermined range of azimuthal angles is substantially the same for neighbourhoods at all locations on the diffuser.

In other words, the azimuthal angles of the plurality of optical elements are preferably chosen so that the luminous emittance appears uniform over the area of the diffuser, when viewed from azimuthal angles within the predetermined range (and from within a certain range of polar angles).

Preferably, the distribution of light over all azimuthal angles is substantially the same for neighbourhoods at all locations on the diffuser. Then, the luminous emittance will appear uniform when viewed from any azimuthal angle.

Optionally, the azimuthal angles are chosen such that the distribution of light is substantially uniform over azimuthal angles, in each individual neighbourhood. That is, each neighbourhood of the diffuser directs equal amounts of light to every azimuthal angle. This uniformity over azimuth means that each part of the diffuser appears to have the same brightness from all azimuthal angles. That is, when an observer walks around the luminaire, the perceived brightness of each part of the luminaire remains constant.

In some embodiments the azimuthal angle of the redirected light from a given optical element may be chosen randomly, according to a uniform distribution. This means that there is no preference among azimuthal angles—for a given optical element, every azimuthal angle is equally likely to be chosen.

In general, the micro-optical elements may have the same shapes or different shapes. Some or all of the elements may be polygons—for example, squares, rectangles, or hexagons.

The light source can preferably be approximated as a point source. For example, the light source may comprise a Light-Emitting Diode (LED).

According to another aspect of the invention there is provided a method of designing and manufacturing a diffuser for a luminaire, the luminaire comprising a light source; and an exit window for light from the light source, the diffuser being suitable for diffusing the light at the exit window, wherein the diffuser comprises a plurality of micro-optical elements, each micro-optical element adapted to redirect light from the light source, so that the redirected light from each element emerges from the diffuser at a respective predetermined polar angle, the method comprising:
choosing the polar angles of the micro-optical elements such that the luminous emittance that is output by the diffuser at a first polar angle is uniform among neighbourhoods at different locations on the diffuser; and such that the luminous emittance that is output by the diffuser at a second polar angle is non-uniform among said neighbourhoods; and
manufacturing the diffuser so designed.

According to another aspect of the invention, there is provided a method of designing and manufacturing a diffuser for a luminaire, the luminaire comprising a light source; and an exit window for light from the light source, the diffuser being suitable for diffusing the light at the exit window, wherein the diffuser comprises a plurality of micro-optical elements, each micro-optical element adapted to redirect light from the light source, so that the redirected light from each element emerges from the diffuser at a respective predetermined polar angle, the method comprising:
assigning at least some of the plurality of micro-optical elements as first micro-optical elements, which redirect light from the light source into a first range of polar angles,
wherein the first micro-optical elements occupy a greater proportion of the area of the diffuser in a first neighbourhood than in a second neighbourhood,
wherein the first neighbourhood receives less light from the light source than the second neighbourhood.

According to another aspect of the invention, there is provided a method of designing and manufacturing a diffuser for a luminaire, the luminaire comprising a light source; and an exit window for light from the light source, the diffuser being suitable for diffusing the light at the exit window, wherein the diffuser comprises a plurality of micro-optical elements, each micro-optical element adapted to redirect light from the light source, so that the redirected light from each element emerges from the diffuser at a respective predetermined polar angle, the method comprising:
determining the luminous emittance at the exit window;
assigning at least some of the plurality of micro-optical elements as first micro-optical elements, which redirect light from the light source into a first range of polar angles;
distributing the first micro-optical elements such that, for each of a plurality of locations on the diffuser, the proportion of the local area of the diffuser that is covered by the first micro-optical elements is inversely proportional to the luminous emittance at that location; and
manufacturing the diffuser so designed.

The method may further comprise assigning others of the plurality of micro-optical elements as second micro-optical elements, which redirect light from the light source into a second range of polar angles, different from the first range.

By distributing the first optical elements as defined above, the diffuser may appear to have a uniform luminous emittance, when observed from a polar angle in the first range of polar angles and may appear to have a non-uniform luminous emittance, when observed from a polar angle in the second range of polar angles.

BRIEF DESCRIPTION OF THE DRAWINGS

Examples of the invention will now be described in detail with reference to the accompanying drawings, in which.

DETAILED DESCRIPTION OF THE EMBODIMENTS

Embodiments of the present invention use a customized optical structure that makes an initially non-uniform exit window appear uniform within a range of polar angles. Such a structure can be realized by faceted optical elements—for example, a microstructure made using laser ablation or 3D printing in the form of an optical plate. This can potentially provide a relatively low-cost solution.

As explained in the introduction, the main disadvantage of the present LED lighting systems is their spottiness. The spottiness stems from the geometrical form-factor of the LED light sources. The present invention makes the luminaire exit window appear uniform within a certain range of angles where it is most advantageous to reduce the spottiness. Embodiments of the invention can redirect (diffuse) the light directly—without sending it back to the luminaire. This can allow much higher optical efficiency to be achieved.

In embodiments of the present invention, a diffuser comprises a plate made up of many small optical elements. Each optical element has one or more facets, which send the light that arrives at that optical element to a particular angle. In some optical elements, a single facet redirects the light by refraction. In other optical elements, one facet redirects the light by total internal reflection (optionally with another facet further redirecting the light by refraction). Thus, the optical elements diffuse the light, creating a beam. The light is diffused in a special way, wherein the angles to which the light is diffused depend on the position within the exit window. This allows a spatially uniform luminous emittance to be created within certain angles, because the initial non-uniformity of the exit window is compensated for by the preferential redirection of the light in certain directions.

In one embodiment, the density of the optical elements that redirect the light into a given direction is proportional to the reciprocal of the original luminous emittance distribution of the exit window. This leads to a uniform luminous emittance, when observed from this given direction. In another embodiment, the size of the optical elements that redirect the light into a given direction is proportional to the reciprocal of the initial luminous emittance distribution of the exit window. This also leads to a uniform luminous emittance in the given direction. These embodiments can be combined, if desired.

Preferably, the diffuser makes the luminous emittance appear uniform for a range of directions—that is, a range of polar angles, for a given azimuthal angle or for all azimuthal angles.

Embodiments will be described below, which will explain in detail the way in which the current invention creates a uniform luminous emittance.

Figure 1:
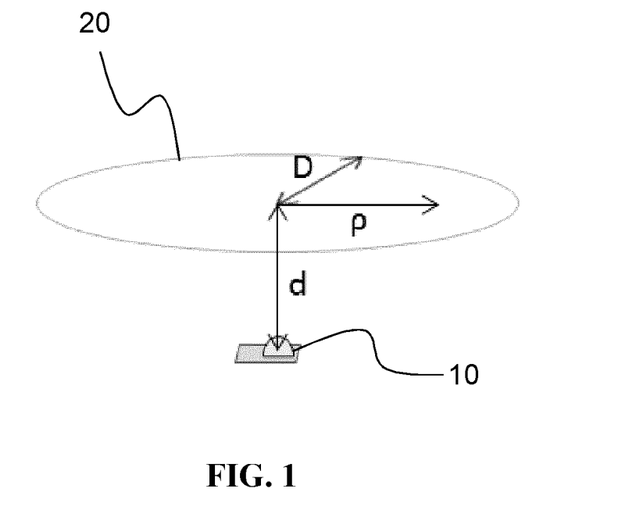
FIG. 1 schematically illustrates the geometry of a luminaire according to an embodiment of the invention.

In the exemplary embodiments, the luminaire has the geometry illustrated in FIG. 1. This shows a luminaire comprising a single light source 10 and a circular exit window 20, of radius D, positioned at a distance d from the light source. The light source 10 is an LED. If there is no optical structure present at the opening that provides the exit window 20, the luminous emittance of the exit window is highly non-uniform. Indeed, an observer can see the light source 10 directly.

Figure 2:
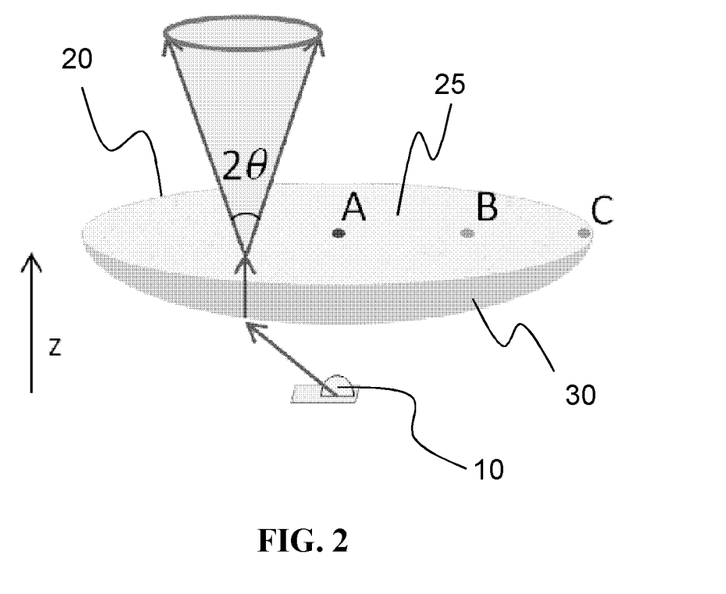
FIG. 2 shows a luminaire having the geometry shown in FIG. 1, with a diffuser at the exit window.

A known way to try to make the exit window more uniform is to first collimate the light from the light source (for example, using a lens or a collimator) and then diffuse the light using a diffuser, to produce a beam with a desired angular spread. Such solution is shown in FIG. 2. This is a schematic view of a luminaire that makes a beam of angular width $2\theta$. In order to prevent an observer from seeing the source 10 directly—and thus improve the apparent spatial uniformity of the luminous emittance of the exit window 20—the system utilizes a diffuser 25 and a lens 30. The lens 30 is positioned between the light source 10 and the diffuser 25. The diffuser is positioned at the exit window 20. The lens 30 collimates the light so that it arrives at the planar exit window 20 substantially in the direction normal to the window—that is, substantially perpendicular to the plane of the window. In practice, the collimation will not be perfect—an angular spread of up to 5° is acceptable for practical purposes. Also, the angular spread may vary at different positions within the exit window. However, this variation can either be ignored or taken into account when redirecting the light.

The diffuser 25 diffuses the collimated light, creating a pencil of light with opening angle $2\theta$, at every position of the exit window. Three locations within the exit window 25 are labelled for later reference. Location A is the middle of exit window; Location B is halfway between the middle and the outer edge of the exit window; and Location C is the outer edge of the exit window. For simplicity, the geometry is assumed to be rotationally symmetric. Therefore, the radial coordinate completely characterises each part of the luminaire—in particular, the diffuser 25 at the exit window 20. (Of course, as those skilled in the art will appreciate, the present invention is not limited to a rotationally symmetric geometry.)

Figure 3:
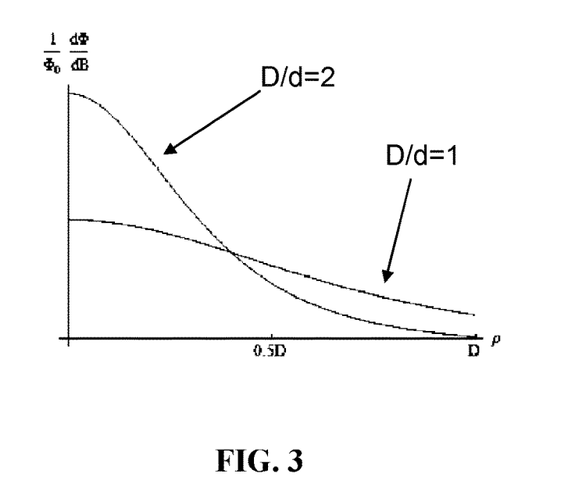
FIG. 3 is a graph illustrating the luminous emittance of the exit window for the luminaire of FIG. 2.

When a luminaire having this geometry is observed from an inclination (polar) angle that is greater than $\theta$, the apparent luminous emittance of the exit window is zero. When it is observed from an inclination (polar) angle of less than $\theta$, the luminous emittance appears to the observer to be more uniform than for a bare source having no diffuser. Nevertheless, although the light source 10 cannot be seen directly through the diffuser 25, the luminous emittance of the exit window is not yet completely uniform. Assuming that the light source 10 can be approximated as a Lambertian emitter, the luminous emittance can be calculated as a function of the radial coordinate within the exit window. This function is shown in FIG. 3. In this graph, the luminous emittance is normalized by the total flux emitted by the source. In greater detail, FIG. 3 shows the normalized flux per unit area dB as a function of the radial coordinate $\rho$ within the exit window. Two curves are shown, in arbitrary units corresponding to two different ratios of the radius, D, of the exit window 20 to the distance, d, between the exit window 20 and the source 10. The radius, D, is a dimension in the plane of the exit window. The distance, d, is a dimension perpendicular to the exit window. The flux is normalized by the total flux $\Phi_0$ emitted by the light source 10. As FIG. 3 shows, the wider the exit window and/or the closer the exit window to the source, the less uniform the luminous emittance becomes—that is, the greater the variation from the centre of the exit window 20 to its peripheral edge.

The luminous emittance plots in FIG. 3 are described by the following equation, which is derived from the geometry of FIG. 2:

$$\frac{1}{\Phi_0}\frac{d\Phi}{dB} = \frac{1}{\pi d^2[1 + (\rho/d)^2]^2} \quad (3)$$

Here, the variable D is implicitly contained in $\rho$. That is, D is the limit for $\rho$. This equation can be rewritten for a dimensionless $\rho'=\rho/D$. Then $\rho' \leq 1$ and the equation will contain the ratio D/d explicitly.

According to an embodiment of the invention, customized faceted optics are employed in the diffuser. The principle of operation of this embodiment will now be described. In this embodiment, the geometry of the luminaire is the same as that shown in FIG. 2. The light from the light source 10 is collimated by the collimator 30. However, the diffuser 25 of FIG. 2 is replaced with a diffuser 200. The collimator 30 is implemented by a Fresnel lens, in the present embodiment.

The diffuser 200 comprises a circular plate covered with faceted optical elements. That is, each optical element comprises at least one facet for redirecting light from the light source 10. The plate 200 comprises two different classes of elements, characterised by two respective types of facet. The types are distinguished by the orientation of the facet. Facets of the first type redirect the light from the light source into a first range of polar angles; and facets of the second type redirect the light from the light source into a second range of polar angles. The relationship between the orientation of the facet and the angle of the redirected light ray depends on the refractive index of the media concerned. This will be explained later (below) in greater detail.

The facets of the first type are distributed so as to ensure that the apparent luminous emittance of the diffuser is uniform within the first range of angles. The facets of the second type are used to distribute the remainder of the light over the second range of angles—that is, the rest of the angles of the desired beam.

A spatially uniform luminous emittance (within a desired first range of angles) is achieved by distributing the facets of the first class over the surface of the exit window such that the local density of the facets is proportional to the reciprocal of the luminous emittance at the exit window. In other words, the density of the first class is the reciprocal of the function illustrated in FIG. 3 and expressed by equation (3). A distribution of this form is illustrated schematically in the left-hand drawing in FIG. 4.

Figure 4:
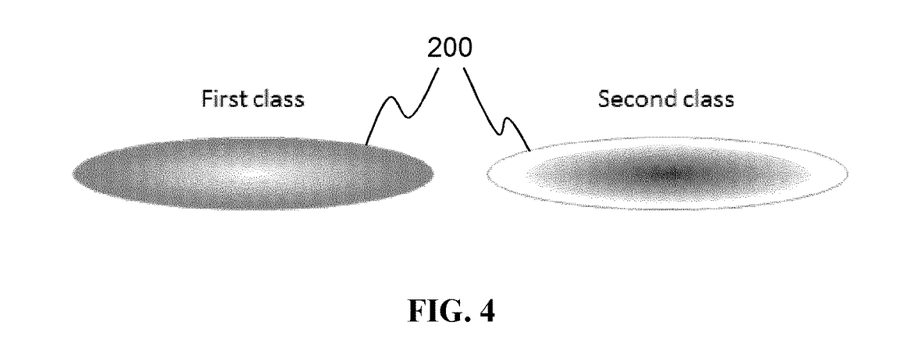
FIG. 4 shows the spatial distribution of two classes of optical elements, according to an embodiment of the invention.

FIG. 4 illustrates how the local density of each class of facets varies spatially over the area of the diffuser 200. Darker regions indicate a higher density of facets; lighter regions indicate a lower density of facets. The left-hand drawing shows the distribution of the first class of facets and the right-hand drawing shows the distribution of the second class of facets. Facets of the first class occur with highest density at the periphery of the diffuser 200—farthest from the light source 10. They occur with lowest density in the centre of the diffuser—closest to the light source. The spatial distribution of the second class of facets complements the distribution of the first class. In particular, the remaining area of the exit window, not covered by the facets of the first class, is occupied by facets of the second class. Consequently, facets of the second class occur with lowest density at the periphery of the diffuser 200—farthest from the light source 10. They occur with highest density in the centre of the diffuser—closest to the light source. The local density is the density that is measured over a neighbourhood size of 1 mm$^2$ to 2 mm$^2$.

The spatial distributions of the facets of each class can allow the diffuser to compensate fully for the non-uniformity in luminous emittance and thus ensure that the luminous emittance within the first range of polar angles (produced by the facets of the first class) is spatially uniform. Having assigned facets of each class to particular spatial locations on the diffuser, based on the required density distributions, the specific orientation of each facet can then be chosen. For the first class of facets, the orientations are randomized in polar angle such that the desired first range of polar angles is filled with the light redirected by them. The orientations are also randomized in azimuthal angle such that they are uniformly spread over the full 360° range of azimuthal directions. For the second class of facets, the orientations are randomized in polar angle such that the second range of polar angles is filled with the light redirected by them. The orientations are also randomized in azimuthal angle, such that they are uniformly spread over the full 360° range of azimuthal directions (the same as for the first class).

In the present embodiment, the randomisation comprises randomly assigning the polar angle of the redirected ray to one of a discrete set of quantised angles. This is done in a uniform fashion, so that approximately the same number of facets is provided for each discrete angle. Consequently, approximately the same amount of light will be redirected to each (quantised) angle. If the number of discrete polar angles is N and the number of discrete azimuthal angles is M, then, taking the reciprocal of equation (3) and dividing by the number of angles, the density of facets (of the first class) redirecting light to each particular angle is given by the expression:

$$\frac{1}{NMS_{element}}\left[1+\left(\frac{\rho}{d}\right)^2\right]^2 / \left[1+\left(\frac{D}{d}\right)^2\right]^2 \qquad (4)$$

Here, $S_{element}$ is the surface area of the optical element. This expresses the density in facets per square millimeter (/mm$^2$). The term $1/S_{element}$ gives the maximal element density. From that maximal density we take the fraction that is given by the ratio between the minimal luminous emittance (that is, when $\rho=D$) and the current luminous emittance. Thus, if the luminous emittance is minimal we need to use all the area for the uniform part of the beam, in the case we want to maximize the uniform part of the beam; while when the luminous emittance larger than its minimal value a smaller area can be used for the uniform part of the beam.

In practice, the discrete quantisation of the angles will not be apparent to the observer, because the collimation is not perfect and so there is a small angular spread (for example, 5°) in the light arriving at and exiting each optical element. This will help to "blur" the distinction between consecutive quantised angles.

Figure 5:
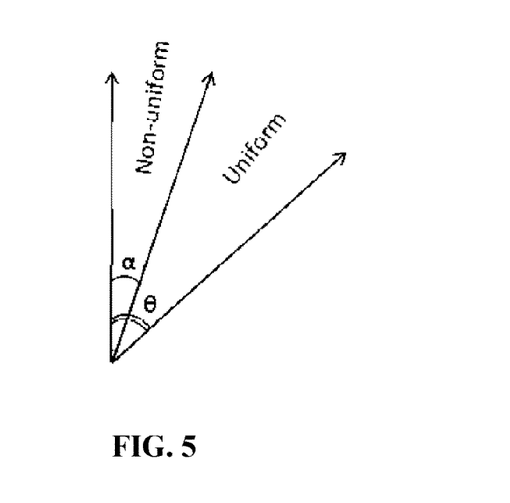
FIG. 5 shows the angular range of two parts of the beam of light generated by a luminaire according to an embodiment of the invention.
Figure 6:
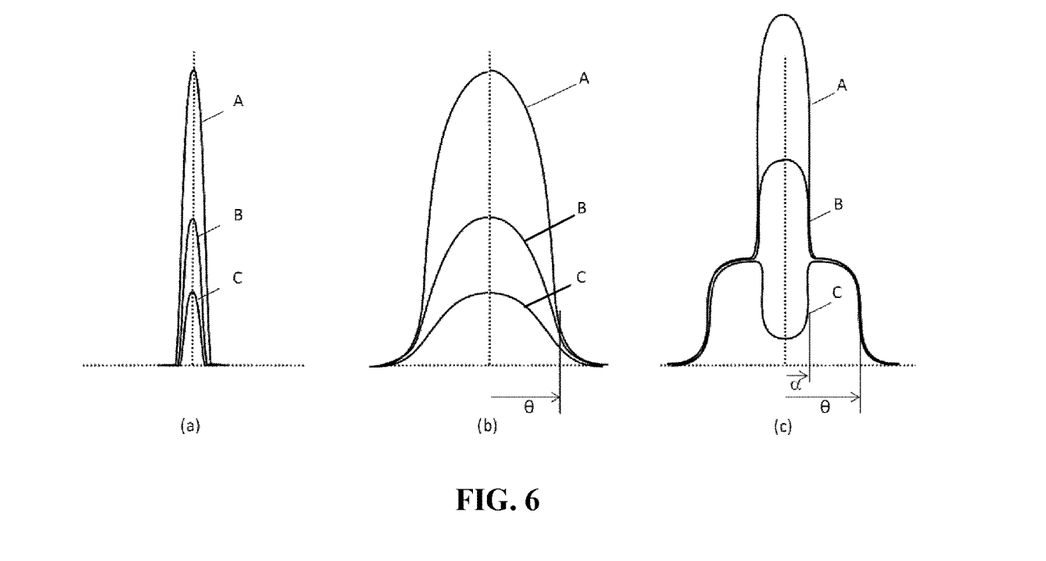
FIG. 6 shows the far-field angular distribution of light according to three different luminaires.

The resulting beam, generated by the two classes of facets, is illustrated in FIGS. 5-6. As shown in FIG. 5, the total (half) beam width is θ. Light rays within the polar angle α (alpha) are produced by the second class of facets. To an observer within this angle the luminous emittance of the exit window appears non-uniform. The light within the angles between θ and α is produced by the facets of the first class. To an observer within this range of angles the luminous emittance of the exit window appears uniform.

Note that we do not distinguish between the viewing angle of the observer and the polar angle in which the light is emitted from the exit window. Strictly, for an observer looking at the exit window 20 from a finite distance, the light arriving at the observer's eye from different parts of the exit window will have left the exit window at different polar angles. However, for viewing-distances that are relatively large compared with the size of the exit window, this variation can be neglected. Instead, it is assumed that all of the light reaching the observer's eye, from different locations in the exit window, emanated from the exit window at a single, unique polar angle. It is safe to make this approximation, in practice, provided that the luminaire subtends an angle of no more than 1° to 5° at the observer's eye.

FIG. 6 plots the far-field angular distribution of the beam emanating from three different locations on the exit window 20. These are the locations labelled A, B, and C in FIG. 2. Luminous intensity (on the y-axis) is plotted against polar angle (on the x-axis). FIG. 6(a) shows the distributions if no diffuser is used and the beam spread is as small as possible. FIG. 6(b) shows the distributions if a conventional diffuser is used, as discussed above in connection with FIG. 2. FIG. 6(c) shows the distributions for the present embodiment of the invention. This corresponds to the light-beam illustrated in FIG. 5. In FIG. 6(c), it can be seen that the angular distributions at locations A, B, and C converge in the range of angles between θ and α. Thus, the embodiment has achieved spatial uniformity—locations A, B, C of the diffuser appear equally bright, to an observer viewing the luminaire from any polar angle between θ and α. For the inclination angles smaller than α, the luminous emittance appears non-uniform.

In practical lighting situations people rarely look at luminaires at small inclination (polar) angles, because the luminaires are normally placed on the ceiling and/or because they are uncomfortably bright to look at. Therefore, in order to make the luminaire appear uniform it is sufficient to make it appear uniform within a range of angles between θ and α. In the present example, θ is 60° and a is 30°.

It is worth noting that a special diffuser, in which the opening angle of the light-pencil varies with position, would not be able to produce a uniform luminous emittance like that produced by embodiments of the present invention. Such a "special diffuser" would control the spread of diffused light, without controlling the direction toward which the light is diffused. This is not sufficient to achieve the desired uniformity of appearance.

Uniformity can be assessed using the following metric, U:

$$U = 1 - \frac{l_{max} - l_{min}}{l_{max} + l_{min}} \quad (5)$$

In this equation $l_{max}$ and $l_{min}$ are the maximum and minimum values, respectively, of luminous emittance measured over the different locations in the exit window. When U=1, the luminous emittance is perfectly uniform (that is, homogeneous). When U=0, the luminous emittance is highly non-uniform. In practice, the exit window will appear uniform to an observer if U>0.5. More preferably, U>0.6.

The luminous emittance at a given angle can be physically measured using a luminance meter oriented at the luminaire from that angle. Alternatively, an imaging luminance meter can be used. This can be thought of as a camera with a small aperture, which is aimed at the luminaire from a suitable viewing distance (typically 2 m to 5 m). The maximum pixel value recorded by the camera represents the maximum luminous emittance in equation (5) above, and the minimum pixel value represents the minimum luminous emittance.

For the embodiment described above, the optical elements (of both classes) are implemented by refractive facets on a surface of the diffuser. The structure of these will now be described in greater detail, with reference to FIGS. 7-8.

Figure 7:
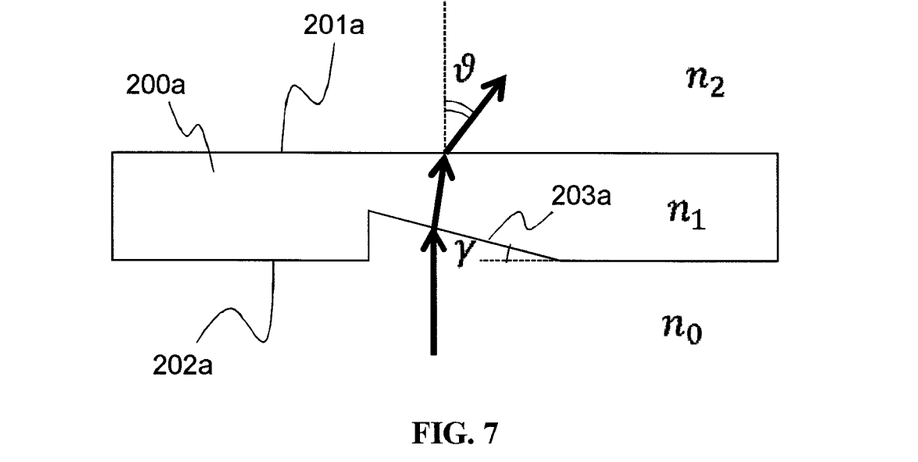
FIG. 7 schematically illustrates a refractive optical element formed on the inner surface of the diffuser, according to an embodiment of the invention.

FIG. 7 is a schematic illustration of a portion of a diffuser 200a. The diffuser 200a has one surface 201a facing outwardly from the luminaire and another surface 202a facing inwardly, towards the light source 10. For simplicity, only a single optical element comprising a refractive facet 203a is illustrated and the rest of the diffuser is flat. In practice, the optical element 203a may be directly adjacent to other facets, providing other optical elements. In this example, the refractive facet 203a is formed in the inward-facing surface 202a. In general, the collimated light arriving at the diffuser 200a from the light source 10 is refracted first at the facet 203a, as it enters the diffuser, and again at the outward-facing surface 201a, as it exits the diffuser. The facet is oriented with a polar angle of γ. The facet orientation is the orientation of the normal to this facet. The material of the diffuser has a refractive index $n_1$. The air outside the luminaire has a refractive index $n_2$. The medium between the light source and the diffuser 200a has a refractive index $n_0$. In the present example, this medium is also air, in which case $n_0=n_2$. For the optical element to have a desired output polar angle $\vartheta$ (that is, in order for the optical element to redirect light to the polar angle $\vartheta$) the facet-angle γ is determined by the following equation:

$$\gamma = a\tan\left[\frac{n_2/n_1 \sin\vartheta}{\sqrt{1-(n_2/n_1)^2\sin^2\vartheta} - n_0/n_1}\right] \quad (6)$$

This equation is used to determine the angles of the facets. In the embodiment described earlier above, the diffuser was designed to appear non-uniform for polar angles from 0° to 30° and designed to appear uniform for polar angles from 30° to 60°. Assuming that the diffuser is manufactured of polycarbonate having a refractive index $n_1=1.585$ and that the medium on both sides of the diffuser is air, having a refractive index $n_0=n_2=1$, the facets of the first class will have polar orientations, γ, between 44.8° and 69.3°. The facets of the second class will have polar orientations, γ, between 0° and 44.8°.

Figure 8:
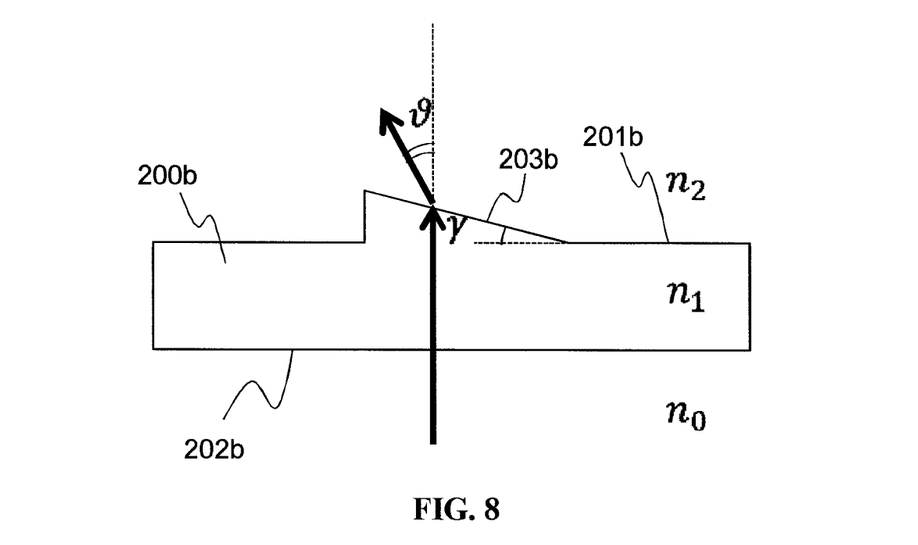
FIG. 8 schematically illustrates a refractive optical element formed on the outer surface of the diffuser, according to another embodiment.

FIG. 8 shows the corresponding geometry for a diffuser 200b in which the facet 203b is provided on the outwardly facing surface 201b. The inwardly facing surface 202b, which faces towards the light source, is flat. In this example, because the collimated light arrives at the surface 202b in the direction normal to the surface, it is not refracted at this surface. It is only refracted at the facet 203b in the output surface 201b. In this case, the equation for choosing the proper polar facet-angle γ is:

$$\gamma = a\tan\left[\frac{\sin\vartheta}{n_1/n_2 - \cos\vartheta}\right] \quad (7)$$

Figure 9:
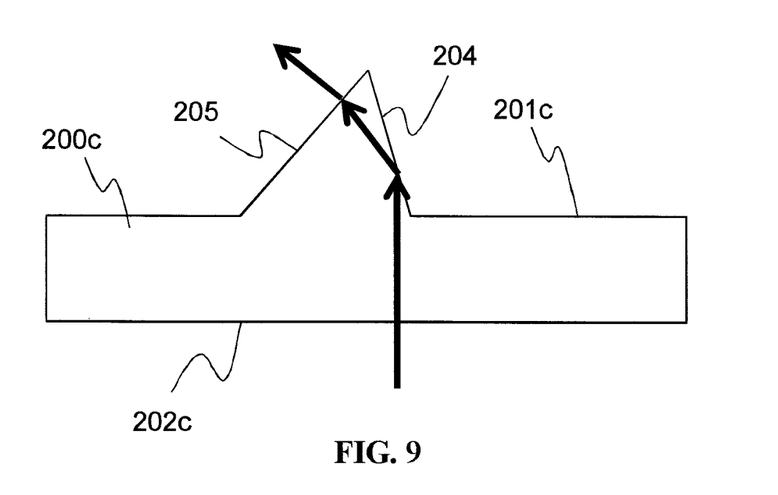
FIG. 9 schematically illustrates an optical element using total internal reflection, according to still another embodiment.

FIG. 9 shows a different kind of optical element, which may be useful in other embodiments. The optical element in this diffuser 200c uses Total Internal Reflection (TIR) to redirect the light. The light from the light source 10 enters the diffuser via the inward-facing surface 202c, in the direction normal to the surface. There is no refraction at this interface. A wedge-shaped protrusion is formed in the outward-facing surface 201c. This comprises a TIR facet 204 and a refraction facet 205. The light is reflected internally at the TIR facet 204 and subsequently refracted at the output facet 205. The polar angle at which the redirected light emerges from the diffuser 200c depends on the angles of both facets. This provides the designer with two degrees of freedom. It can also enable the light to be redirected to larger polar angles than is possible using refraction alone. Referring again to FIG. 5, an embodiment using TIR optical elements may be able to achieve a uniform luminous emittance at larger polar angles and over a larger range of polar angles. For example, it may be possible to provide uniform luminous emittance between the angles α=25° and θ=70°.

Figure 10:
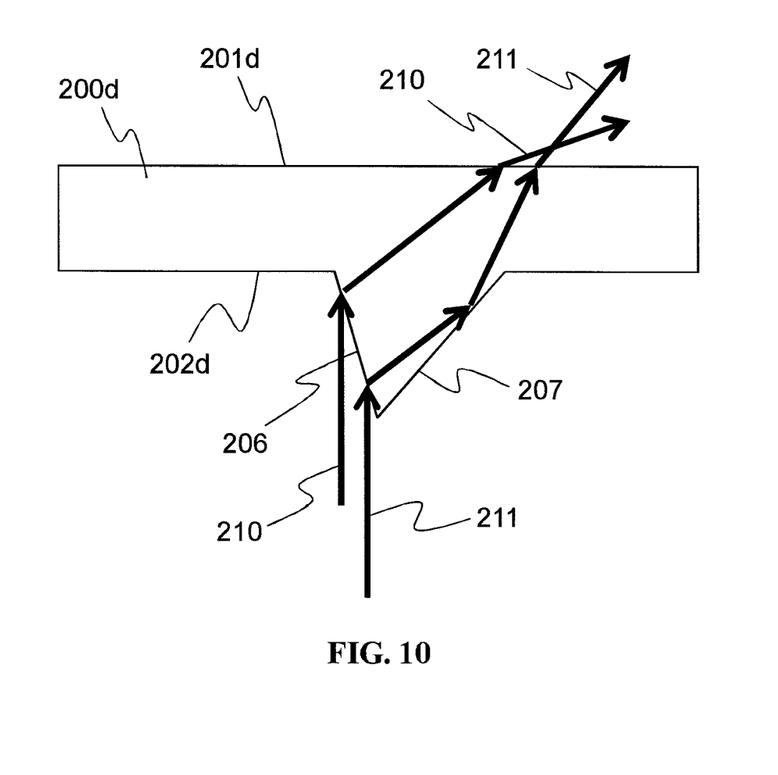
FIG. 10 schematically illustrates an optical element using total internal reflection, according to yet another embodiment.

FIG. 10 shows yet another kind of optical element. The optical element in this diffuser 200d uses both TIR and refraction to redirect the light. Two facets, refraction facet 206 and reflection facet 207 are formed on the inward facing surface 202d of the diffuser. The outward facing surface 201d is flat. Two light rays 210 and 211 are illustrated in FIG. 10. Both rays arrive at the diffuser 200d in the direction normal to the diffuser and are refracted similarly at the refraction facet 206, where they enter the diffuser. The first ray 210 travels directly to the outward-facing surface 201d and is refracted a second time. The second ray 211 travels from the refraction facet 206 to the TIR facet 207, where it undergoes total internal reflection. From here, it travels to the outward-facing surface of the diffuser, where it is refracted again as it emerges into the air. Because the second ray 211 follows a different path and undergoes reflection (at TIR facet 207), it emerges from the diffuser at a different angle. Thus, these are two optical elements (two facets) and there are rays that interact with both. The same applies to FIG. 9, where some rays will not interact with the TIR facet 204 and will travel directly from the inward-facing surface 202c to the refraction facet.

It is not essential that all the optical elements in the diffuser have the same structure. In some embodiments, the diffuser may comprise optical elements which include a mixture of two or more of the kinds illustrated in FIGS. 7-9.

In typical embodiments the density of facets (of both classes) is in the range 5 facets/mm² to 13000 facets/mm². For the embodiment described above, this total density is uniform over the whole area of the diffuser. However, the proportion of facets of the first and second classes, in any given neighbourhood, varies over the diffuser. The average facet size is in the range 0.0067 mm² to 0.2 mm².

Production techniques for fabricating an optical device comprising faceted optical elements are known in the art. From the foregoing description, it will be apparent to those skilled in the art how to design diffusers according to embodiments of the present invention. Once designed, these can be fabricated using methods similar to those used for the known micro-optical devices, for example laser ablation or 3D printing. Diffusers according to embodiments of the invention can be made of a variety of materials. Preferably, the material is transparent. For example the diffuser can be formed of a transparent polycarbonate material.

In the embodiments described above, the size of the facets (that is, the area of the diffuser covered by each facet) was kept approximately constant and the spatial density of facets of the first class was varied according to the reciprocal of the luminous emittance. As an alternative, the density can be maintained approximately constant and the size of each facet can be varied according to the reciprocal of the luminous emittance. Provided that the size of each facet is kept small enough that it cannot be resolved by the human eye, from a suitable viewing distance, the apparent luminous emittance remains uniform.

In the embodiment described above, a Fresnel lens was used as a collimator. However, as those skilled in the art will by now appreciate, the invention is not limited to a particular type of collimator. Other suitable collimators include, but are not limited to: a TIR collimator; and a concentrator such as a Compound Parabolic Concentrator (CPC).

In the embodiments above, it was assumed that all angles in the first range receive equal amounts of light. This may be desirable but it is not essential. The most important uniformity requirement is that the amount of light redirected to a given polar angle is the same for every local neighbourhood on the diffuser. This ensures that the exit window appears spatially uniform, when viewed from that polar angle. Optionally, in addition to this, the amount of light redirected to every angle can be the same (for each local neighbourhood on the diffuser). This was the case for the examples described above—the same amount of light is output for every angle in the first range of angles as well as for every location on the diffuser.

In the embodiments described above, the micro-optical elements comprised one or more facets. However, in other embodiments a micro-optical element may comprise a free-shape micro-optical lens, a flat facet, a curved surface, or a prismatic micro-structure.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A luminaire comprising:
a light source;
an exit window for light from the light source; and
a diffuser at the exit window for diffusing the light,
wherein the diffuser comprises a plurality of micro-optical elements, each micro-optical element adapted to redirect light from the light source, so that the redirected light from each element emerges from the diffuser at a respective predetermined polar angle,
wherein the plurality of micro-optical elements comprises first micro-optical elements, which redirect light from the light source into a first range of polar angles,
wherein the first optical elements occupy a greater proportion of the area of the diffuser in a first neighbourhood than in a second neighbourhood,
wherein the first neighbourhood receives less light from the light source than the second neighbourhood and a local density of the first optical elements is proportional to the reciprocal of the luminous emittance at the exit window,
wherein the plurality of micro-optical elements further comprises second micro-optical elements, which redirect light from the light source into a second range of polar angles,
wherein the polar angles of the first range are greater than the polar angles of the second range, and
wherein a spatial distribution of the second optical elements complements a spatial distribution of the first optical elements.

2. The luminaire of claim 1, wherein a remaining area of the exit window, not covered by the first micro-optical elements, is occupied by second micro-optical elements.

3. The luminaire of claim 2, wherein the second micro-optical elements occupy a greater proportion of the area of the diffuser in the second neighbourhood than in the first neighbourhood.

4. The luminaire of claim 1, wherein each micro-optical element comprises at least one of the following micro-optical structures: a free-shape micro-optical lens, a flat facet, a curved surface, and a prismatic micro-structure.

5. The luminaire of claim 1, wherein for each of a plurality of locations on the diffuser, the proportion of the local area of the diffuser that is covered by the first micro-optical elements is inversely proportional to the luminous emittance at that location.

6. The luminaire of claim 5, wherein the second range of polar angles is from 0° to an angle alpha and the first range of polar angles is from the angle alpha to 60° or more, wherein alpha is less than or equal to 30°.

7. The luminaire of claim 6, wherein first micro-optical elements of greater area are provided in the first neighbourhood, compared with the second neighbourhood.

8. The luminaire of claim 7, for each of a plurality of locations on the diffuser, the proportion U:

$$U = 1 - \frac{l_{max} - l_{min}}{l_{max} + l_{min}}$$

wherein $l_{max}$ and $l_{min}$ are the maximum and minimum values, respectively, of luminous emittance measured over the different locations in the exit window.

9. The luminaire of claim 1, wherein, in each micro-optical element, there is at least one facet, which is adapted to redirect the light by at least one of: refraction; and total internal reflection.

10. The luminaire of claim 1, wherein the diffuser is arranged so that the light from the light source arrives at the diffuser in a direction substantially normal to the diffuser.

11. The luminaire of claim 1, wherein the micro-optical elements are provided on a surface of the diffuser facing the light source.

12. The luminaire of claim 1, wherein the micro-optical elements are provided on a surface of the diffuser facing away from the light source.

13. The luminaire of claim 1, wherein the redirected light emerges from each micro-optical element at a predetermined azimuthal angle, wherein the distribution of light over a predetermined range of azimuthal angles is substantially the same for neighbourhoods at different locations on the diffuser.

14. A method of designing and manufacturing a diffuser for a luminaire, the luminaire comprising a light source; and an exit window for light from the light source, the diffuser being suitable for diffusing the light at the exit window,
wherein the diffuser comprises a plurality of micro-optical elements, each micro-optical element adapted to redirect light from the light source, so that the redirected light from each element emerges from the diffuser at a respective predetermined polar angle, the method comprising:

determining the luminous emittance at the exit window;

assigning at least some of the plurality of micro-optical elements as first micro-optical elements, which redirect light from the light source into a first range of polar angles;

distributing the first micro-optical elements such that, for each of a plurality of locations on the diffuser, the proportion of the local area of the diffuser that is covered by the first micro-optical elements is inversely proportional to the luminous emittance at that location;

assigning at least some of the plurality of micro-optical elements as second micro-optical elements such that a spatial distribution of the second optical elements complements a spatial distribution of the first optical elements, which second micro-optical elements redirect light from the light source into a second range of polar angles wherein the polar angles of the first range are greater than the polar angles of the second range; and manufacturing the diffuser so designed.

* * * * *